(12) United States Patent
Sato et al.

(10) Patent No.: US 8,037,257 B2
(45) Date of Patent: Oct. 11, 2011

(54) STORAGE SYSTEM AND PATH MANAGEMENT METHOD FOR MULTI-HOST ENVIRONMENT

(75) Inventors: Akihisa Sato, Yokohama (JP); Haruki Masuda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 655 days.

(21) Appl. No.: 12/007,533

(22) Filed: Jan. 11, 2008

(65) Prior Publication Data
US 2009/0006780 A1    Jan. 1, 2009

(30) Foreign Application Priority Data
Jun. 27, 2007 (JP) ................................. 2007-169637

(51) Int. Cl.
*G06F 12/00* (2006.01)
(52) U.S. Cl. ................. 711/154; 711/100; 711/E12.001
(58) Field of Classification Search .................. 711/100, 711/154, E12.001
See application file for complete search history.

(56) References Cited

U.S. PATENT DOCUMENTS

| | | | |
|---|---|---|---|
| 2002/0069320 A1* | 6/2002 | Yagi et al. | 711/112 |
| 2006/0026346 A1 | 2/2006 | Kadoiri et al. | |
| 2007/0016681 A1* | 1/2007 | Suzuki et al. | 709/227 |

FOREIGN PATENT DOCUMENTS

JP    2005-010956    6/2003

* cited by examiner

*Primary Examiner* — Mardochee Chery
(74) *Attorney, Agent, or Firm* — Volpe and Koenig, P.C.

(57) ABSTRACT

A storage system and a path management method, which can facilitate node replacement are proposed. In the storage system, the host sets plural paths between the host and the volume and holds path information composed of management information on each of the paths. The management apparatus includes an integrated path management unit that collects the path information on each of the paths defined between the host and the volume from the corresponding host to manage all the collected information as integrated path information; retrieves an alternate path going through a node other than a specified node but has the same function as the specified node, for the path going through the specified node, based on the integrated path information; and displays results of the retrieval.

12 Claims, 18 Drawing Sheets

FIG.2

| +Hosts | Subsystems |
| Subsystems | Subsystems |

| -Subsystem1 |
| -Subsystem2 |
| -Subsystem3 |

| Subsystem List | |
|---|---|
| Name | Serial Number |
| Subsystem1 | 000001 |
| Subsystem2 | 000002 |
| Subsystem3 | 000003 |

+Hosts
-Subsystems
 -Subsystem1
 -Subsystem2
 -Subsystem3

Subsystem1
Subsystems>Subsystem1

| Paths | CHA Ports |
|---|---|
| ☐ | CHA Ports |
| ☑ | CHA1 |
| ☐ | CHA2 |
| ☐ | CHA3 |
| ☐ | CHA4 |

44 — (checked CHA1)
43 — (unchecked boxes)

[Show Paths] 45

42

| Paths | | | | | | |
|---|---|---|---|---|---|---|
| Path List | | | | | | |
| Status | Host | HBA Port | Path ID | Subsystem | CHA Port | VOL |
| Online | Host1 | HBA1 | 0001 | Subsystem1 | CHA1 | VOL1 |
| Online | Host2 | HBA2 | 0002 | Subsystem1 | CHA1 | VOL1 |
| Offline | Host3 | HBA1 | 0003 | Subsystem1 | CHA1 | VOL2 |
| Online | Host4 | HBA2 | 0004 | Subsystem1 | CHA1 | VOL2 |

46

47

| Refresh Hosts | | |
|---|---|---|
| Host List | | |
| EXECUTE HOST INFORMATION UPDATE FOR FOLLOWING HOSTS? | | |
| Host | Last Update Time | Other Host Info |
| Host1 | 2007-04-25 15:05:30 | |
| Host2 | 2007-04-24 15:00:00 | |
| Host3 | 2007-04-20 12:05:30 | |
| Host4 | 2007-04-25 15:05:30 | |

OK (52)  Cancel (53)  51

Refresh Hosts — PROCESSING. PLEASE WAIT.  54

FIG.8

Refresh Hosts

| Host List | | | |
|---|---|---|---|
| HOST INFORMATION UPDATE FOR FOLLOWING HOSTS HAS COMPLETED. | | | |
| Result | Host | Last Update Time | Other Host Info |
| Success | Host1 | 2007-04-26 16:05:30 | |
| Success | Host2 | 2007-04-26 16:05:30 | |
| Success | Host3 | 2007-04-26 16:05:30 | |
| Success | Host4 | 2007-04-26 16:05:30 | |

[ Close ]

-Hosts
  -Host1
  -Host2
  -Host3
  -Host4
  ⋮
+Subsystems

Host1     [ Refresh Host ]

Hosts > Host1

| Summary | |
|---|---|
| Last Update Time | 2007-04-26 16:05:30 |

| Paths | HBA Ports |

| Status | Host | HBA Port | Path ID | Subsystem | CHA Port | VOL |
|---|---|---|---|---|---|---|
| Online | Host1 | HBA1 | 0001 | Subsystem1 | CHA1 | VOL1 |
| Offline | Host1 | HBA2 | 0002 | Subsystem1 | CHA2 | VOL1 |
| Online | Host1 | HBA1 | 0003 | Subsystem1 | CHA1 | VOL2 |
| Online | Host1 | HBA2 | 0004 | Subsystem1 | CHA2 | VOL2 |

| PATH ID | HBA | Subsystem | CHA | VOL | Status |
|---|---|---|---|---|---|
| 0001 | HBA1 | ST1 | CHA1 | VOL1 | Online |
| 0002 | HBA2 | ST1 | CHA2 | VOL1 | Online |

| PATH ID | Host | HBA | Subsystem | CHA | MAINTENANCE INFORMATION | VOL | Status |
|---|---|---|---|---|---|---|---|
| 0001 | HOST1 | HBA1 | ST1 | CHA1 | ON | VOL1 | Offline |
| 0002 | HOST1 | HBA2 | ST1 | CHA2 | OFF | VOL1 | Online |
| 0003 | HOST2 | HBA1 | ST1 | CHA3 | OFF | VOL2 | Offline |
| 0004 | HOST2 | HBA2 | ST1 | CHA4 | OFF | VOL2 | Online |

ALTERNATE PATH CONFIRMATION

Path List

IF CHA 1 IS STOPPED, FOLLOWING PATHS WILL STOP.
PLEASE CONFIRM EXISTENCE OF EFFECTIVE ALTERNATE PATHS.

| Status | Host | HBA Port | Path ID | Subsystem | CHA Port | VOL | ALTERNATE PATH |
|---|---|---|---|---|---|---|---|
| Online | Host1 | HBA1 | 0001 | Subsystem1 | CHA1 | VOL1 | 2 |
| Online | Host2 | HBA2 | 0002 | Subsystem1 | CHA1 | VOL1 | 1 |
| Offline | Host3 | HBA1 | 0003 | Subsystem1 | CHA1 | VOL2 | 0 |
| Online | Host4 | HBA2 | 0004 | Subsystem1 | CHA1 | VOL2 | 1 |

| SIMULTANEOUSLY STOPPABLE CHA | | |
|---|---|---|
| CHA List | | |
| DISPLAY SETS OF CHAS ABLE TO BE STOPPED SIMULTANEOUSLY WITH CHA1.<br>EITHER OF EACH FOLLOWING CHA SET IS ABLE TO BE STOPPED SIMULTANEOUSLY WITH CHA1. | | |
| # | CHA Port | Action |
| 0001 | CHA3 | Show Paths ~71 |
| | CHA4 | |
| 0002 | CHA5 | Show Paths ~71 |
| | CHA6 | |

- Hosts
  - Host1
  - Host2
  - Host3
  - Host4
  ...
- +Subsystems

Host1

Hosts > Host1

[Refresh Host]

Summary

| Last Update Time | 2007-04-26 16:05:30 |

Paths | HBA Ports

| Status | Host | HBA Port | Path ID | Subsystem | CHA Port | MAINTENANCE INFORMATION | VOL |
|---|---|---|---|---|---|---|---|
| Online | Host1 | HBA1 | 0001 | Subsystem1 | CHA1 | UNDERGOING MAINTENANCE | VOL1 |
| Offline | Host1 | HBA2 | 0002 | Subsystem1 | CHA2 | - | VOL1 |
| Online | Host1 | HBA1 | 0003 | Subsystem1 | CHA1 | UNDERGOING MAINTENANCE | VOL2 |
| Online | Host1 | HBA2 | 0004 | Subsystem1 | CHA2 | - | VOL2 |

Alerts

Alert List

| Severity | Date | Host | Description |
|---|---|---|---|
| Error | 2007-04-21 16:00:30 | Host2 | ERROR HAS OCCURRED IN PATH WITH PATH ID "0004" |
| Error | 2007-04-22 20:10:00 | Host2 | ERROR HAS OCCURRED IN PATH WITH PATH ID "0003" |
| Error | 2007-04-23 16:05:30 | Host1 | ERROR HAS OCCURRED IN PATH WITH PATH ID "0001" |

Alerts

Alert List

| Severity | Date | Host | Description |
|---|---|---|---|
| Error | 2007-04-21 16:00:30 | Host2 | ERROR HAS OCCURRED IN PATH WITH PATH ID "0004" |
| Error | 2007-04-22 20:10:00 | Host2 | ERROR HAS OCCURRED IN PATH WITH PATH ID "0003" |
| Error | 2007-04-23 16:05:30 | Host1 | PATH WITH PATH ID "0001" IS TEMPORARILY UNAVAILABLE BECAUSE CHA1 IS UNDERGOING MAINTENANCE |

FIG.22

| Alert ID | Host | RECEIPT DATE | LEVEL OF IMPORTANCE | MESSAGE ID | MESSAGE | VOL | Subsystem | CHA | HBA | PATH ID |
|---|---|---|---|---|---|---|---|---|---|---|
| 0001 | HOST2 | 2007-04-20 12:30:00 | Error | MSG0001 | ERROR HAS OCCURRED IN PATH WITH PATH ID "0004" | VOL2 | ST1 | CHA2 | HBA2 | 0004 |
| 0002 | HOST2 | 2007-04-20 12:30:00 | Error | MSG0001 | ERROR HAS OCCURRED IN PATH WITH PATH ID "0003" | VOL1 | ST1 | CHA1 | HBA2 | 0003 |
| 0003 | HOST1 | 2007-04-20 12:30:00 | Error | MSG0010 | PATH WITH PATH ID "0001" IS TEMPORARILY UNAVAILABLE BECAUSE CHA1 IS UNDERGOING MAINTENANCE | VOL1 | ST1 | CHA1 | HBA1 | 0001 |

91A 91B 91C 91D 91E 91F 91G 91H 91I 91J 91K

91

STORAGE SYSTEM AND PATH MANAGEMENT METHOD FOR MULTI-HOST ENVIRONMENT

CROSS-REFERENCES TO RELATED APPLICATIONS

This application relates to and claims priority from Japanese Patent Application No. 2007-169637, filed on Jun. 27, 2007, the entire disclosure of which is incorporated herein by reference.

BACKGROUND

1. Field of the Invention

The invention relates to a storage system and a path management method, and is suitable for use in, for example, a storage system in which plural hosts connected to the same storage apparatus are provided in a SAN (Storage Area Network) (hereinafter referred to as "multi-host environment"); and the hosts share channel adapters in the storage apparatus, where the channel adapters are interfaces with the hosts.

2. Description of Related Art

In a storage system, when a channel adapter in a storage apparatus, or a controller for controlling the operation of the entire storage apparatus or a micro program that is a control program on the operation control of the storage apparatus is to be replaced, the replacement target has to be stopped temporarily.

Therefore, when no data input/output path for alternation not going through a replacement-target channel adapter or the like and in an online state (hereinafter referred to as "path") exist between a host and a storage apparatus, the access to a logical volume from the host via a currently-used path is interrupted. This leads to the problem of suspension of operation.

In light of this, the replacement of a channel adapter or similar in a storage apparatus has conventionally needed the following. Before replacing the channel adapter or similar, all the hosts that will be affected by the replacement are identified; the latest management information for each path connected to the hosts (the information on the path's state or route, and hereinafter referred to as "path information") is acquired; and the path connecting the relevant host to the relevant storage apparatus is changed to an alternate path (one available at this time, i.e., that is in an online state) based on the acquired path information.

JP2005-010956 A discloses a method in which the logical path loads are acquired; and the logical paths to be assigned with data input/output requests are decided according to the loads. US2006-0026346 discloses a method of deciding paths according to resource loads.

However, in a large-scale and complicated multi-path environment, there has been a problem that the above-described identification of the alternate path for the path that goes through the replacement-target channel adapter or similar, requires considerable amounts of labor and time. In addition, after completion of the replacement of the channel adapter or similar, confirmation that all paths affected by the replacement have returned to normal is required. Therefore, there has also been a problem that the confirmation requires considerable amounts of labor and time.

Moreover, there has been a problem that the replacement of the channel adapter or similar requires considerable amounts of labor and time for the reason that the replacement needs to normally take place for each replacement-target, which leads to repetition of the work involved.

Furthermore, when the channel adapter or similar is suspended, software for monitoring the path state erroneously recognizes that a failure has occurred in a path going through the channel adapter or similar. As a result, a warning is displayed on a management server. Therefore, this has been a problem that it is difficult for a storage system administrator to make a judgment as to whether the path is intentionally and temporarily in an error state because the replacement of the channel adapter or similar, or a failure has occurred during actual business operation.

SUMMARY

The present invention has been made in light of the above, and an object of the invention is to propose a storage system and a path management method that can facilitate replacement of a node such as a channel adapter.

In order to solve the above-described problems, according to the invention, there is provided a storage system including: a host that is a host system; a storage apparatus that provides a volume that is a storage area for data input/output with the host; and a management apparatus that manages a path for data input/output, the path being set between the host and the volume, characterized in that: the host sets plural paths between the host and the volume and holds path information composed of management information on each of the paths; and the management apparatus includes an integrated path management unit that collects the path information on each of the paths defined between the host and the volume from the corresponding host to manage all the collected information as integrated path information; retrieves an alternate path going through a node other than a specified node but that has the same function as the specified node, for the path going through the specified node, based on the integrated path information; and displays results of the retrieval.

A path management method for a storage system including: a host that is a host system; a storage apparatus that provides a volume that is a storage area for data input/output with the host; and a management apparatus that manages a path for data input/output, the path being set between the host and the volume, the method being characterized in that: a first step of the host setting plural paths between the host and the volume and holding path information composed of management information on each of the set paths; and a second step of the management apparatus collecting the path information on each of the paths defined between the host and the volume from the corresponding host to manage all the collected information as integrated path information; retrieving an alternate path going through a node other than a specified node but that has the same function as the specified node, for the path going through the specified node, based on the integrated path information; and displaying results of the retrieval.

According to the invention, an alternate path can be identified easily in the node replacement, and accordingly, the node replacement itself can be facilitated.

BRIEF DESCRIPTION OF THE DRAWINGS

FIG. 2 is a simplified line diagram showing a subsystem list screen.

FIG. 3 is a simplified line diagram showing a channel adapter list screen.

FIG. 8 is a simplified line diagram showing a host refresh confirmation screen displayed after the execution of host refresh processing.

FIG. 9 is a simplified line diagram showing a host path list screen.

FIG. 10 is a conceptual diagram showing a path management table.

FIG. 11 is a conceptual diagram showing an integrated path management table.

FIG. 14 is a simplified line diagram showing an alternate path confirmation screen.

FIG. 16 is a simplified line diagram showing a simultaneously stoppable channel adapter confirmation screen.

FIG. 18 is a simplified line diagram showing a host path list screen in accordance with this embodiment.

FIG. 20 is a simplified line diagram showing a example of an alert display screen for the case where a maintenance information display function is not executed.

FIG. 21 is a simplified line diagram showing a example of an alert display screen for the case where a maintenance information display function is executed.

FIG. 22 is a conceptual diagram showing an alert management table.

DETAILED DESCRIPTION OF PREFERRED EMBODIMENTS

An embodiment of the present invention will be described below in detail with reference to the accompanying drawings.

(1) Configuration for Storage System in This Embodiment

Figure 1:
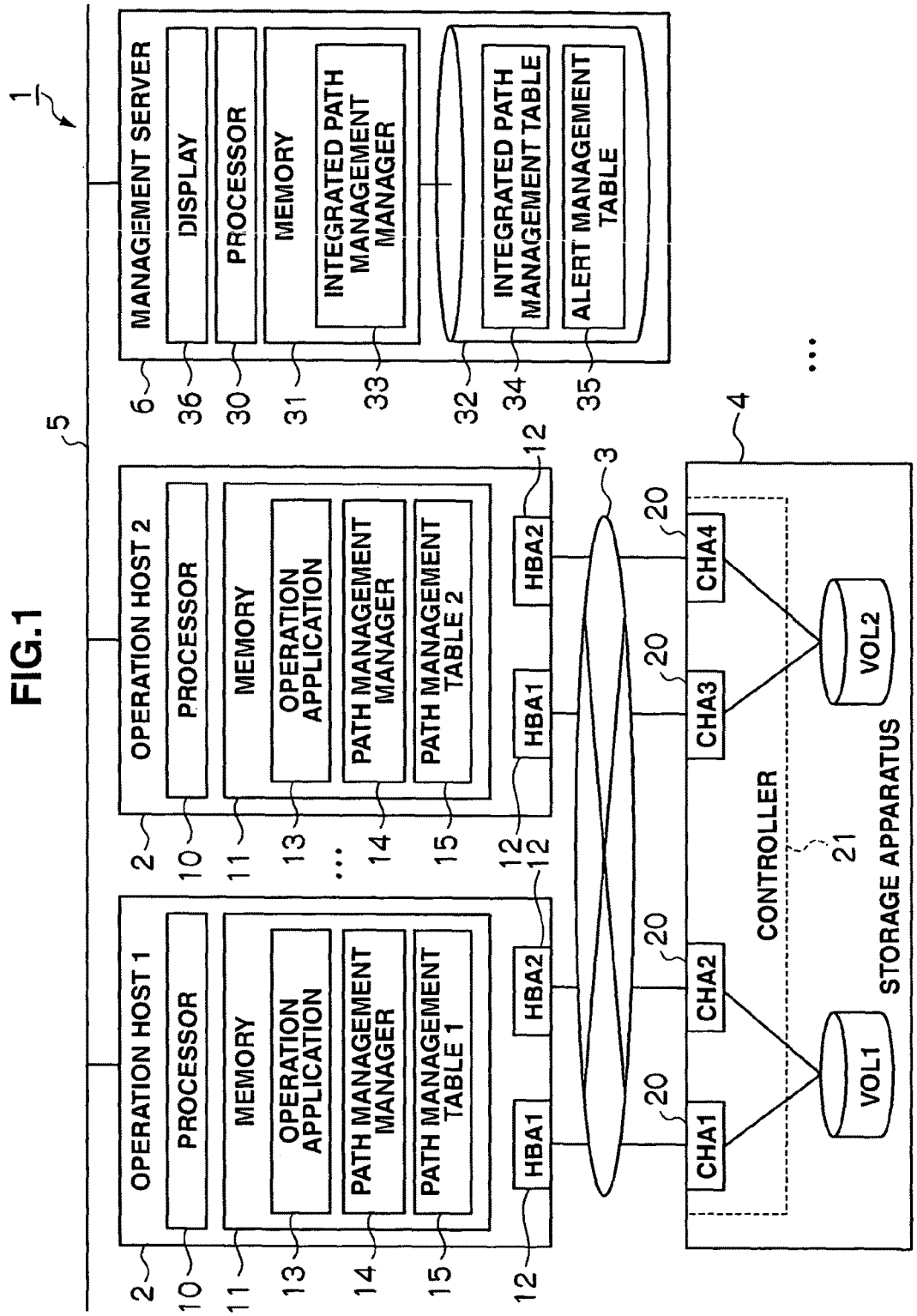
FIG. 1 is a block diagram showing a configuration for a storage system in accordance with an embodiment of the present invention.

In FIG. 1, reference numeral 1 indicates a storage system as a whole according to this embodiment. The storage system 1 has a configuration in which: plural operation hosts 2, which are host apparatuses, are connected to a storage apparatus 4 via a first network 3 composed of a SAN or the like; and the operation hosts 2 are connected to a management server 6 via a second network 5 composed of a LAN (Local Area Network) or the like.

Each of the operation hosts 2 is configured to include information processing resources such as a processor 10, memory 11, and plural host bus adapters 12. An operation application 13 is run as operation application software in the memory 11. The processor 10 executes the operation application 13, thereby executing predetermined operation processing in the entire operation host 2. Also, the memory 11 stores a path management manager 14 and a path management table 15, which will be described later. Each of the host bus adapters 12 is an interface for having the operation host 2 access the storage apparatus 4 via the first network 3, and is composed of, e.g., an FC (Fibre Channel) card.

The storage apparatus 4 is composed of a controller 21 including plural channel adapters 20 and plural storage devices not shown in the drawing.

Each of the channel adapters 20 is an interface for having the storage apparatus 4 communicate with the operation hosts 2 via the first network 3, and is composed of, e.g., an FC card. The channel adapter 20 is provided with one or more ports, which are assigned with network addresses such as WWN (World Wide Name) or IP (Internet Protocol) addresses to be distinguish between one another on the first network 3.

The storage devices are composed of, e.g., expensive disk drives such as FC disks or inexpensive disk drives such as FATA (Fibre Attached Technology Adapted) disks, SATA (Serial AT Attachment) disks, or optical disk drives. One or more logical volumes VOL are defined in a storage area provided by one or more disk devices. Data from the operation hosts 2 is read/written in blocks of an identified size from/to the logical volumes VOL.

Each logical volume VOL is assigned a unique identifier (LUN: Logical Unit Number). In this embodiment, that identifier and a unique number allocated to each block (LBA: Logical Block Address) are combined to form an address, and data is input or output by designating the relevant address.

The controller 21 is configured to include not only the above-mentioned channel adapters 20 but also information processing resources such as a CPU (Central Processing Unit) and memory, and controls input/output of data to/from the logical volumes VOL in response to requests from the operation hosts 2.

The management server 6 is a server for managing the entire system, and is equipped with a processor 30, memory 31, a storage device 32, and further a display 36 that displays a GUI (Graphical User Interface) for conducting various settings or issuing execution orders to the operation hosts 2 and input devices (not shown in the figure) such as a keyboard and a mouse for performing various operations and inputting various settings.

Various control programs are run in the memory 31. The processor 30 executes these control programs, thereby executing various kinds of processing in the management server 6. An integrated path management manager 33, which will be described later, is also run in the memory 31.

The storage device 32 is composed of, e.g., a hard disk drive, and stores various control programs and various control parameters. The storage device also stores an integrated path management table 34 and an alert management table 35, which will be described later. Moreover, for example, a CRT (Cathode-Ray Tube) or a liquid crystal monitor is utilized for the display 36.

(2) Path Management Function in This Embodiment

(2-1) Alternate Path Retrieval and Display Function

Next, an alternate path retrieval and display function provided in the storage system 1 will be described. First, the specific flow of an operation for identifying an alternate path for a path that goes through a replacement-target channel adapter in a conventional storage system will be described.

In a conventional storage system, when conducting identification of an alternate path for a path that goes through a replacement-target channel adapter, a user first operates a management server, and has it display the subsystem list screen 40 shown in FIG. 2.

The subsystem list screen 40 displays an ID ("Name") and a serial number ("Serial Number") for each storage apparatus to which paths are set for each operation host managed by the management server in list form.

The user selects the storage apparatus including the channel adapter to be replaced on the subsystem list screen 40. As a result, the channel adapter list screen 42 shown in FIG. 3 is displayed on the management server.

The channel adapter list screen 42 displays an ID for each of the channel adapters provided in the storage apparatus selected in the subsystem list screen 40 in list form. The user selects a replacement-target channel adapter (displays a checkmark 44 in its corresponding checkbox 43) and then clicks the "Show Paths" button 45 displayed in the channel adapter list screen 42's lower right part. As a result, the subsystem path list screen 46 shown in FIG. 4 is displayed on the management server.

The subsystem path list screen 46 displays information (path information) about an online/offline state ("Online"/ "Offline") and a route indicated by, e.g., IDs ("Host", "Subsystem") for each operation host and the storage apparatus connected to the path concerned for each of the paths going through the channel adapter selected in the channel adapter list screen 42 in list form. The user identifies all the operation hosts connected to the paths going through the replacement-target channel adapter based on the path information for each path displayed on the subsystem path list screen 46, and writes down the IDs for the operation hosts for reference.

Figures 4, 5:
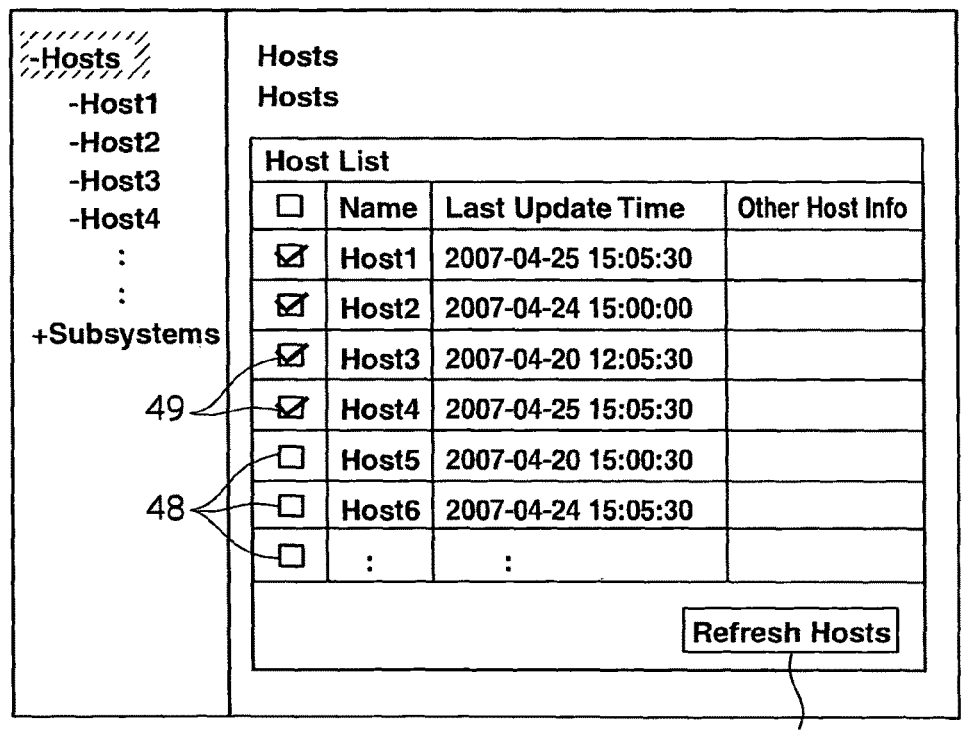
FIG. 4 is a simplified line diagram showing a subsystem path list screen.
FIG. 5 is a simplified line diagram showing a host list screen.

The user then operates the management server, and has it display the host list screen 47 shown in FIG. 5. The host list screen 47 displays an ID ("Name") for each of the hosts managed by the management server and the last time path information on each path connected to the relevant host was updated ("Last Update Time") in list form.

Figures 6, 7:
FIG. 6 is a simplified line diagram showing a host refresh confirmation screen displayed before the execution of host refresh processing.
FIG. 7 is a simplified line diagram showing a dialog displayed during the execution of host refresh processing.

The user selects all the written-down operation hosts, i.e., all the operation hosts connected to the paths going through the replacement-target channel adapter (displays checkmarks 49 in the corresponding checkboxes 48), and then clicks the "Refresh Hosts" button 50 displayed in the lower right part of the host list screen 47. As a result, the host refresh confirmation screen 51 shown in FIG. 6 is displayed on the management server.

The user clicks the "OK" button 52 displayed in the lower right part of the host refresh confirmation screen 51. As a result, the so-called host refresh, in which the information on each path connected the relevant host is updated, is executed for each of the operation hosts listed on the host refresh confirmation screen 51. Meanwhile, the host refresh confirmation screen 51 is closed by clicking a "Cancel" button 53. If the host refresh is executed, during the host refresh, a dialogue box 54 shown in FIG. 7 is displayed on the management server. After the completion of the host refresh, the host refresh confirmation screen 55 shown in FIG. 8 is displayed on the management server.

After that, the user operates the management server, and has it display the host path list screen 56 shown in FIG. 9 for each operation host connected to the paths going through the replacement-target channel adapter 20. For all the paths connected to the concerned targeted operation host, the host path list screen 56 displays information on the online/offline state ("Online"/"Offline"), the ID for the storage apparatus ("Subsystem") which is connected to the relevant path, and the ID for the channel adapter ("CHA Port") in the storage apparatus through which the path goes through in list form.

The user then checks whether or not there is an alternate path, which is a path going through a channel adapter other than the replacement-target channel adapter and currently in an online state ("Online"), based on the path information for each of the paths displayed on the host path list screen 56. If there is such an alternate path, the path is identified.

As described above, a conventional storage system has a problem in that, when replacing a channel adapter in a storage apparatus, the process of identifying an alternate path from among the paths going through the channel adapter is extremely complicated; and particularly in a large-scale and complicated multi-path environment, such an alternate path identification process requires considerable amounts of labor and time.

In light of the above, in the storage system 1 in this embodiment, the management server 6 is provided with an alternate path retrieval and display function for controlling uniform management for the paths set between the operation hosts 2 and the storage apparatus 4; retrieving an alternate path for the path going through the channel adapter when one of the channel adapters 20 in the storage apparatus 4 is specified by a user; and displaying the retrieval result.

Specifically, with the storage system 1 in this embodiment, the memory 11 in each of the operation hosts 2 stores the path management manager 14, which is software for multiplication for the paths from the operation hosts 2 to the storage apparatus 4, and the path management table 15 which is a table for having the path management manager 14 manage the paths connected to the host concerned.

The path management table 15 is composed of a "Path ID" column 15A, an "HBA" column 15B, a "Subsystem" column 15C, a "CHA" column 15D, a "VOL" column 15E, and a "Status" column 15F, as shown in FIG. 10.

The "Path ID" column 15A stores an ID assigned to each of the paths connected to the host concerned. The "HBA" column 15B, the "Subsystem" column 15C, the "CHA" column 15D, and the "VOL" column 15E respectively store IDs and LUNs for the host bus adapter 12, the storage apparatus 4, the channel adapter 20, and the logical volume VOL the corresponding path goes through or is connected.

Accordingly, FIG. 10 shows that the path given the path ID "0001" is connected to the logical volume VOL given the LUN "VOL1" provided in the storage apparatus 4 via the host bus adapter 12 given the ID "HBA1" in the operation host 2 and the channel adapter 20 given the ID "CHA1" in the storage apparatus 4 given the ID "ST1," and the current path state is "Online."

Meanwhile, in the management server 6, the memory 31 stores an integrated path management manager 33, which is software for controlling uniform management for the path information held by each of the operation hosts 2, and also the storage device 32 stores the integrated path management table 34 for having the integrated path management manager 33 control uniform management for the paths in the storage system 1.

The integrated path management table 34 is composed of a "Path ID" column 34A, a "Host" column 34B, an "HBA" column 34C, a "Subsystem" column 34D, a "CHA" column 34E, a "Maintenance Information" column 34F, a "VOL" column 34G, and a "Status" column 34H.

The "Path ID" column 34A, the "HBA" column 34C, the "Subsystem" column 34D, the "CHA" column 34E, the "VOL" column 34G, and the "Status" column 34H respectively store the same information as stored in the corresponding "Path ID" column 15A, "HBA" column 15B, "Subsystem" column 15C, "CHA" column 15D, "VOL" column 15E, and "Status" column 15F in the path management table 15, the information having been collected from each operation host 2.

The "Host" column 34B stores an ID given to the operation host 2 connected to the relevant path, and the "Maintenance Information" column 34F stores maintenance information on whether or not the relevant path is undergoing maintenance ("ON"/"OFF").

Therefore, for example, FIG. 11 shows that the above-mentioned path given the path ID "0001" described with reference to FIG. 10 is currently undergoing maintenance ("ON").

Incidentally, the IDs and LUN for the operation host 2, the storage apparatus 4, and the logical volume VOL, which are connected to the path, and the IDs for the host bus adapter 12 and the channel adapter 20 through which the path goes will be arbitrarily referred to as a host attribute, a storage attribute, a logical volume attribute, a host bus adapter attribute, and a channel adapter attribute, respectively.

Also, explanation will be given below by referring to the path management manager 14 in the operation host 2 and the integrated path management manager 33 in the management server 6 as the agents of various kinds of processing; however, it is obvious that the processor 10 in the operation host 2 actually executes the corresponding processing in accordance with the path management manager 14; or the processor 30 in the management server 6 actually executes the corresponding processing in accordance with the integrated path management manager 33.

Figure 12:
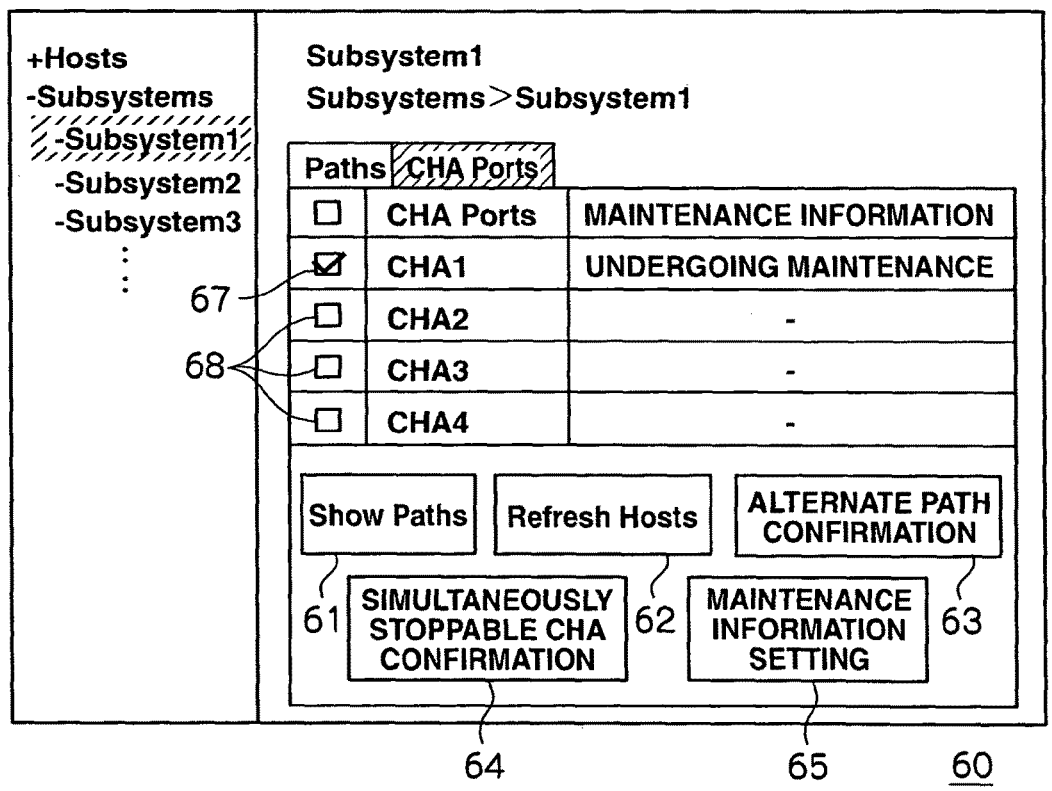
FIG. 12 is a simplified line diagram showing a channel adapter list screen in accordance with this embodiment.

FIG. 12 shows a channel adapter list screen 60 in this embodiment, which is displayed on the display 36 in the management server 6 by selecting a desired storage apparatus 4 in the subsystem list screen 40 described with reference to FIG. 2 and which is displayed instead of the channel adapter list screen 42 described with reference to FIG. 3.

The channel adapter list screen 60 displays the ID and maintenance information for each of the channel adapters 20 provided in the storage apparatus 4 selected on the subsystem list screen 40 in list form.

Also, the channel adapter list screen 60 displays a "Show Paths" button 61, "Refresh Hosts" button 62, an "Alternate Path Confirmation" button 63, a "Simultaneously Stoppable CHA Confirmation" button 64, and a "Maintenance Information Setting" button 65.

The user selects the replacement-target channel adapter 20 (displays a checkmark 67 in its corresponding checkbox 68, and then clicks the "Show Paths" button 61 in the channel adapter list screen 60. As a result, a subsystem path list screen like the subsystem path list screen 46, which shows the path information for each path going through the selected channel adapter 20 and has been described with reference to FIG. 4, is displayed on the display 36.

Also, in the channel adapter list screen 60, the "Refresh Hosts" button 62 is clicked after the selection of a desired channel adapter 20 in the same manner as above, enabling the execution of host refresh in which the path information on each path, which is connected to each of the operation hosts 2 and through which the selected channel adapter 20 goes, is updated.

Figure 13:
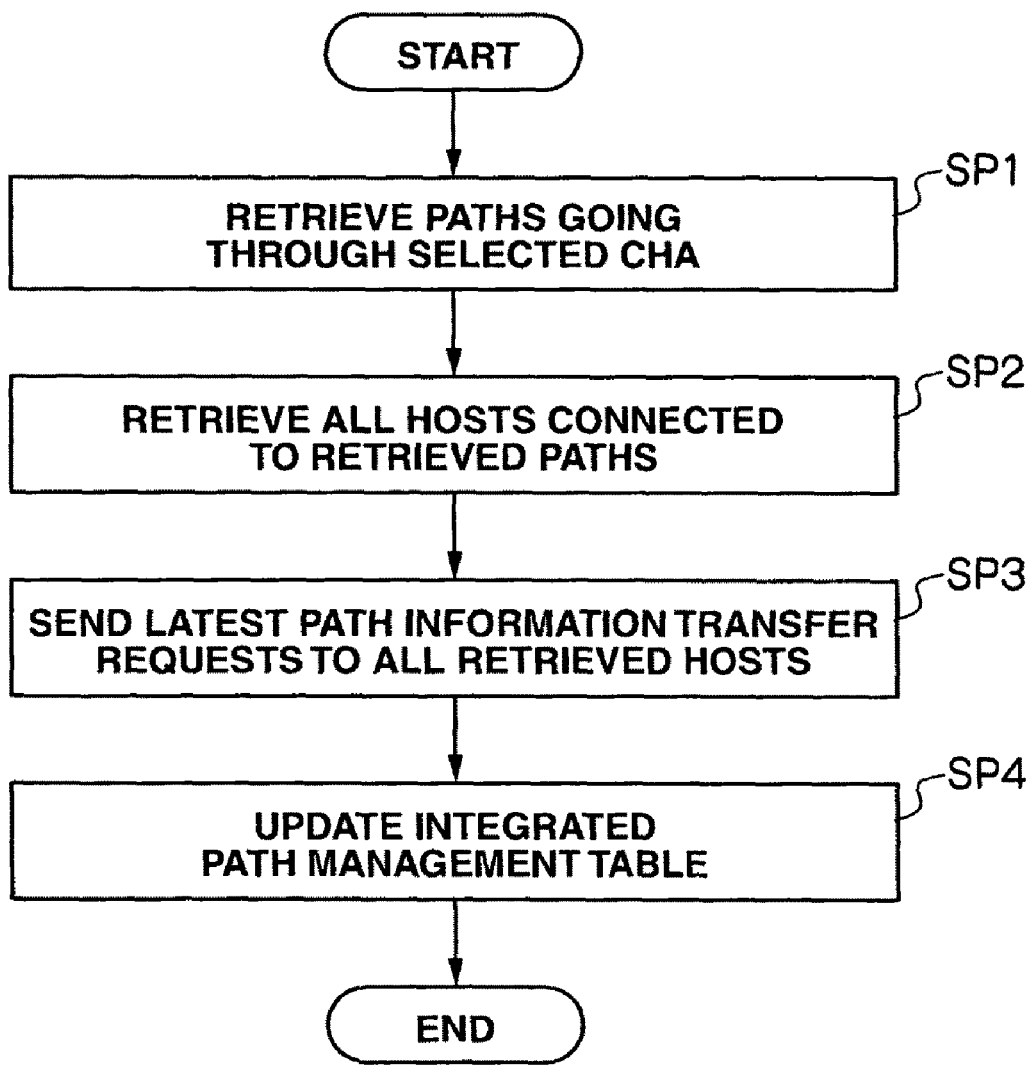
FIG. 13 is a flowchart showing the content of host refresh processing executed by a processor in a management server.

FIG. 13 is a flowchart showing the specific content of processing executed by the integrated path management manager 33 in the management server 6.

After one channel adapter 20 is selected, and the "Refresh Hosts" button 62 is clicked, the integrated path management manager 33 starts the host refresh processing shown in FIG. 13, and first retrieves all the paths going through the above-selected channel adapter 20 in the integrated path management table 34 (SP1). More specifically, the integrated path management manager 33 retrieves the paths for which the integrated path management table 34 stores, in the "CHA" column 34E, the same ID as that for the channel adapter 20 selected on the channel adapter list screen 60.

The integrated path management manager 33 then retrieves all the operation hosts 2 connected to the paths retrieved in the retrieval in the integrated path management table 34 (SP2), and then sends a transfer request for path information (hereinafter referred to as "path information transfer request") to each of the retrieved operation hosts 2 (SP3).

After that, the path management manager 14 in the operation host 2, which has received the path information transfer request, sends the path information, e.g., the path ID for each path connected to the host concerned, host bus adapter attribute, storage attribute, channel adapter attribute, logical volume attribute, and path state (online/offline) and which is collected and managed by the path management manager 14, to the management server 6. Accordingly, the latest path information on each of the operation hosts 2 retrieved at step SP2 is gathered in the management server 6.

Subsequently, the integrated path management manager 33 updates the integrated path management table 34 in accordance with the latest path information on each operation host 2 sent from the operation host 2 that sent the path information transfer request at step SP3 (SP4). As a result, for each of the operation hosts 2 connected to the paths going through the channel adapter 20 selected in the channel adapter list screen 60, the path information on each path connected to each of the operation hosts 2 is updated in the integrated path management table 34.

Meanwhile, a desired channel adapter 20 is selected from among the channel adapters 20 displayed in list form and then the "Alternate Path Confirmation" button 63 (FIG. 12) is clicked in the channel adapter list screen 60. This leads to the retrieval of an alternate path for each path going through the selected channel adapter 20, and the alternate path confirmation screen 66 shown in FIG. 14 for the retrieval result is displayed on the display 36.

The alternate path confirmation screen 66 shows the online/offline state ("Status"), host attribute ("Host"), host bus adapter attribute ("HBA Port"), path ID ("Path ID"), storage attribute ("Subsystem"), channel adapter attribute ("CHA Port"), logical volume attribute ("VOL"), and the number of available alternate paths ("Alternate Path") for each of the paths going through the channel adapter 20 selected on the channel adapter list screen 60.

In the alternate path confirmation screen 66, the number of alternate paths displayed in the "Alternate Path" column ("Alternate Path") is clicked. As a result, the subsystem path list screen 46, which has been described with reference to FIG. 4, showing the path information on the corresponding alternate paths is displayed on the display 36.

Figure 15:
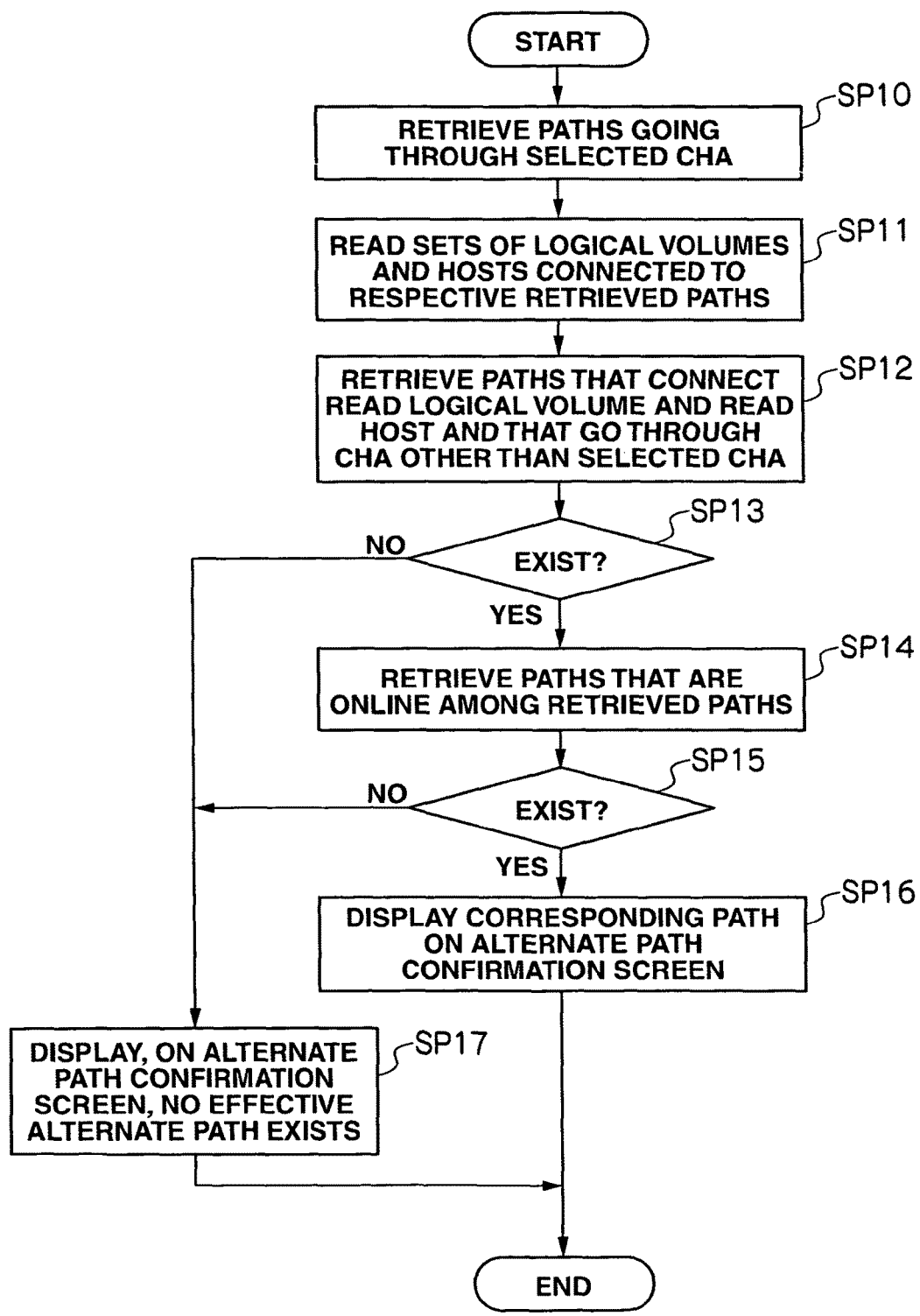
FIG. 15 is a flowchart showing the content of alternate path confirmation processing executed by a processor in a management server.

FIG. 15 is a flowchart showing the specific content of processing executed by the integrated path management manager 33 in the management server 6 concerning the display on the alternate path confirmation screen 66.

After one channel adapter 20 is selected and the "Alternate Path Confirmation" button 63 (FIG. 12) is clicked on the channel adapter list screen 60 (FIG. 12), the integrated path management manager 33 starts the alternate path confirmation processing shown in FIG. 15, and first retrieves all the paths going through the channel adapter 20, which have been selected on the channel adapter list screen 60, in the integrated path management table 34 (SP10).

The integrated path management manager 33 retrieves all the sets of operation hosts 2 and logical volumes VOL, the operation hosts 2 being connected to the paths going through the channel adapter 20 based on the retrieval result at step SP10 (SP11).

Subsequently, for each of the sets of operation hosts 2 and logical volumes VOL, the integrated path management manager 33 retrieves the paths, each of which is connected between the relevant operation host 2 and the logical volume VOL and which goes through the channel adapter 20 other than the channel adapter 20 selected on the channel adapter list screen 60 on the integrated path management table 34 (SP12). The integrated path management manager 33 judges whether or not the corresponding paths exist in this retrieval (SP13).

If the integrated path management manger 33 obtains a negative result for this judgment, it proceeds to step SP17; meanwhile, if it obtains a positive result, it retrieves paths that are in an online state from among the paths retrieved in the retrieval at step SP12 for each of the sets of operation hosts 2 and logical volumes VOL (SP14). The integrated path management manger 33 judges whether or not the corresponding paths exist in this retrieval (SP15).

If the integrated path management manger 33 obtains a positive result for this judgment, it displays the alternate path confirmation screen 66 (FIG. 14) based on the retrieval results at step SP12 and step SP14 on the display 36 (SP16). The integrated path management manager 33 then completes this alternate path confirmation processing.

On the contrary, if the integrated path management manger 33 obtains a negative result for the judgment at step SP15, it displays the alternate path confirmation screen 66 showing a warning to the effect that no effective alternate path exists (SP17). The integrated path management manager 33 then completes the alternate path confirmation processing.

Incidentally, when the alternate path confirmation screen 66 is displayed on the display 36 at step SP16 and any one of the numerical values displayed in the "Alternate Path" column ("Alternate Path") on the alternate path confirmation screen 66 is clicked, the integrated path management manger 33 displays the corresponding subsystem path list screen 46 (FIG. 4) on the display 36.

As a result, the user can identify the alternate path for each path going through the channel adapter 20 selected on the channel adapter list screen 60 in accordance with the alternate path confirmation screen 66 and the subsystem path list screen 46.

Also, after being replaced, the channel adapter 20 is selected on the channel adapter list screen 60, and then the "Refresh Hosts" button 62 is clicked. This leads to the execution of the host refresh for the operation hosts 2 related to each path that was influenced by the replacement of the channel adapter 20. The user clicks the "Show Paths" button 61, thereby checking whether or not the path influenced by the replacement of the channel adapter 20 has returned to normal.

(2-2) Simultaneously Stoppable Channel Adapter Retrieval and Display Function

Next, a simultaneously stoppable channel adapter retrieval and display function provided in the management server 6 will be described. The management server 6 in this embodiment is provided with the simultaneously stoppable channel adapter retrieval and display function for retrieving and displaying replaceable channel adapters 20 when replacing a channel adapter 20 in the storage apparatus 4.

In the management server 6, one replacement-target channel adapter 20 is selected from among the channel adapters 20 displayed on the channel adapter list screen 60 (FIG. 12), and the "Simultaneously Stoppable CHA Confirmation" button 64 (FIG. 12) is clicked. As a result, a simultaneously stoppable channel adapter confirmation screen 70 shown in FIG. 16 is displayed.

The simultaneously stoppable channel adapter confirmation screen 70 displays one or more sets of channel adapters 20 able to be stopped together with the channel adapter 20 selected on the channel adapter list screen 60 (FIG. 12), with a message to the effect that either channel adapter 20 in each of the sets can be stopped together with the channel adapter 20 selected on the channel adapter list screen 60.

The channel adapters 20 set is composed of channel adapters in which, when one channel adapter 20 is stopped, there is an alternate path going through the other channel adapter 20. The alternate path through the other channel adapter 20 does not go through any other channel adapter 20 selected on the channel adapter list screen 60.

The simultaneously stoppable channel adapter confirmation screen 70 displays the IDs for the channel adapters 20 that constitute each of the sets together with set IDs ("#") for each of the sets and "Show Paths" buttons 71 corresponding to the sets.

The user clicks the "Show Paths" buttons 71 corresponding to the desired sets of channel adapters 20. As a result, the subsystem path list screen 46, which has been described with reference to FIG. 4, showing the path information on each path going through each channel adapter 20 constituting the set, is displayed on the display 36.

Figure 17:
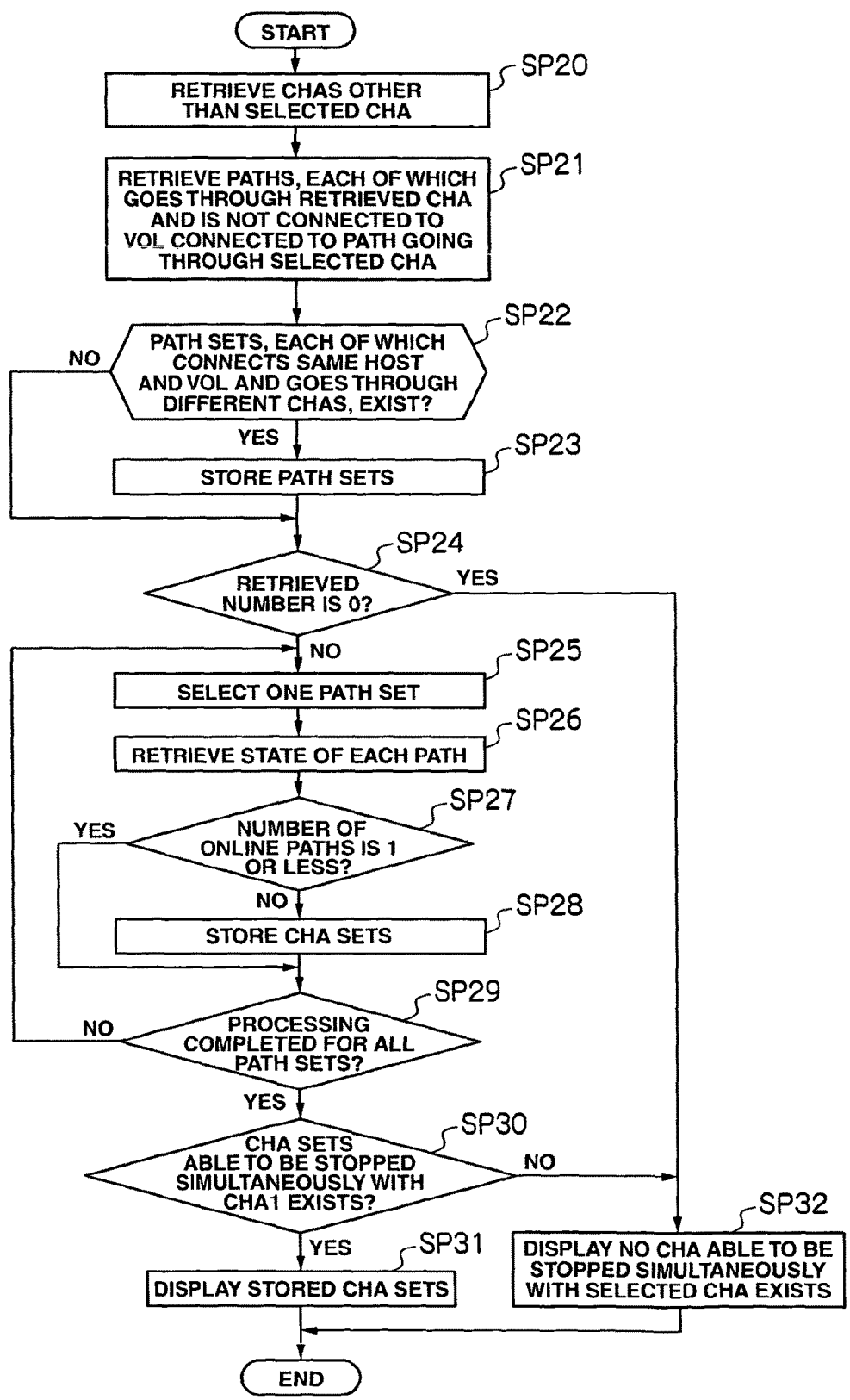
FIG. 17 is a flowchart showing the content of processing for displaying simultaneously stoppable channel adapter confirmation screen which is executed by a processor in a management server.

FIG. 17 is a flowchart showing the specific content of processing executed by the integrated path management manager 33 in the management server 6 concerning the display on the simultaneously stoppable channel adapter confirmation screen 70.

When the "Simultaneously Stoppable CHA Confirmation" button 64 is clicked on the channel adapter list screen 60 (FIG. 12), the integrated path management manager 33 starts simultaneously stoppable channel adapter confirmation screen display processing, and first retrieves the channel adapters, each of which is provided in the same storage apparatus 4 as the channel adapter 20 selected on the channel adapter list screen 60 and which differs from the selected channel adapter 20, in the integrated path management table 34 (SP20).

The integrated path management manager 33 then retrieves the paths, each of which goes through each channel adapter 20 retrieved in the above retrieval and is not connected to the logical volume VOL connected to each path going through the channel adapter 20 selected on the channel adapter list screen 60, in the integrated path management table 34 (SP21).

Subsequently, the integrated path management manager 33 judges whether or not sets of paths, which connect the same operation host 2 with the same logical volume VOL and go through different channel adapters 20, exist among the paths retrieved in the above retrieval (SP22).

If the integrated path management manager 33 obtains a negative result for this judgment, it proceeds to step SP24, meanwhile, if it obtains a positive result, it stores the path sets (SP23).

The integrated path management manager 33 judges whether or not the number of paths stored at step SP23 is "0" (SP24).

If the integrated path management manager 33 obtains a positive result for this judgment (SP24:YES), it proceeds to step SP32. On the other hand, if the integrated path management manager 33 obtains a negative result (SP24:NO), it selects one of the path sets stored at step SP23 (SP25), and retrieves the state of each of the paths that constitute the path set in the integrated path management table 34 (SP26).

The integrated path management manager 33 judges whether or not the number of paths that are in an online state is 1 or less from among the paths constituting the path set based on the retrieval result (SP27). If the integrated path management manager 33 obtains a positive result for this judgment (SP27:YES), it proceeds to step SP29, while if it obtains a negative result (SP27:NO), it stores the sets of channel adapters 20 through which the paths constituting the pass set go (SP28).

The integrated path management manager 33 judges whether or not the same processing as above has been completed for all the path sets stored at step SP23 (SP29). If the integrated path management manager 33 obtains a negative result for this judgment, it returns to step SP25, and repeats the same processing until it obtains a positive result at step SP29 (SP25 to SP29-SP25).

The integrated path management manager 33 finally completes the same processing for all the path sets stored at step SP23, thereby obtaining a positive result at step SP29, and then judges whether or not any sets of channel adapters 20 able to be stopped together with the channel adapter 20 selected on the channel adapter list screen 60 (i.e., sets of channel adapters 20 stored at step SP28) exist (SP30).

If the integrated path management manager 33 obtains a positive result for this judgment, it displays the simultaneously stoppable channel adapter confirmation screen 70, which lists all the sets of channel adapters 20 stored at step SP28 on the display 36 (SP31), and then completes the simultaneously stoppable channel adapter confirmation screen display processing.

Meanwhile, if the integrated path management manager 33 obtains a negative result for the judgment at step SP30, it displays the simultaneously stoppable channel adapter confirmation screen 70, which shows a message on the display 36 to the effect that that no channel adapter 20 able to be stopped simultaneously with the channel adapter 20 selected on the channel adapter list screen 60 exists (SP32), and then completes the simultaneously stoppable channel adapter confirmation screen display processing.

(2-3) Maintenance Information Display Function

A maintenance information display function provided in the management server 6 will be described next. In this embodiment, the management server 6 is provided with the maintenance information display function that, after prior registration for replacement, etc., of the channel adapter 20 in the storage apparatus 4, the channel adapter 20 concerned is undergoing maintenance on the channel adapter list screen 60 (FIG. 12).

Specifically, the user selects a desired channel adapter 20 in the same manner as above and clicks the "Maintenance Information Setting" button 65 on the channel adapter list screen 60, thereby setting the relevant channel adapter 20 to a maintenance mode that indicates the channel adapter 20 is undergoing maintenance. When the channel adapter 20 is set in the maintenance mode, the channel adapter list screen 60 and the host path list screen 80 each show that the channel adapter 20 is undergoing maintenance (each display a character string, "Undergoing Maintenance" in the corresponding "Maintenance Information" column), as shown in FIGS. 12 and 18, respectively.

Figure 19:
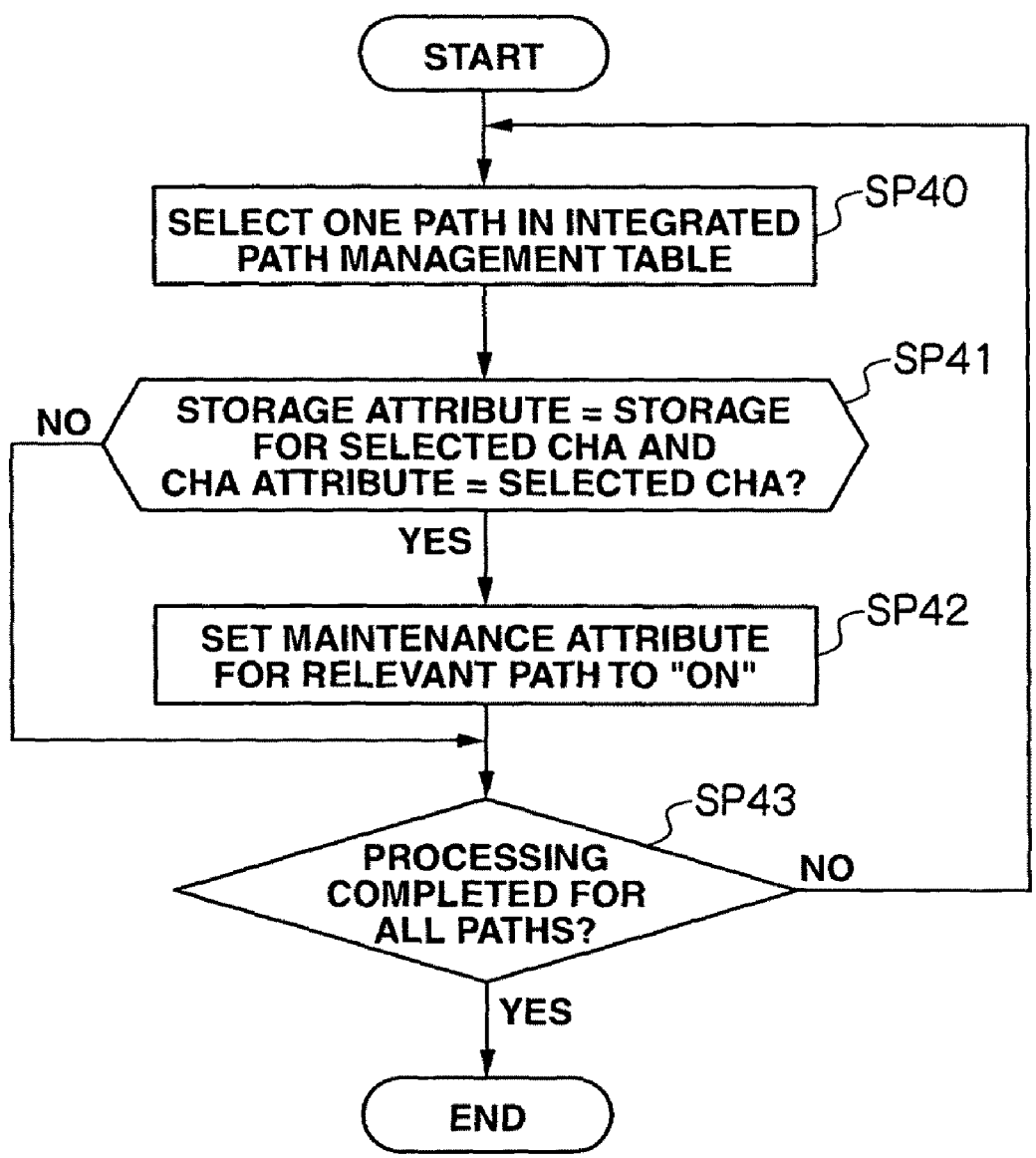
FIG. 19 is a flowchart showing the content of maintenance mode setting processing executed by a processor in a management server.

FIG. 19 is a flowchart showing the specific content of processing executed by the integrated path management manager 33 in the management server 6 concerning the setting of the maintenance mode for the channel adapter 20 in the maintenance information display function.

After one channel adapter 20 is selected and the "Maintenance Information Setting" button 65 is clicked on the channel adapter list screen 60 (FIG. 12), the integrated path management manager 33 starts maintenance mode setting processing shown in FIG. 19, and selects one of the paths registered in the integrated path management table 34 (FIG. 11) (SP40).

The integrated path management manager 33 then judges whether or not the ID stored in the "Subsystem" column 34D and the ID stored in the "CHA" column 34E for the path selected at step SP40 are respectively identical to the ID for the storage apparatus 4 having the channel adapter 20 selected on the channel adapter list screen 60 and the ID for the channel adapter 20 (SP41).

If the integrated path management manager 33 obtains a negative result for this judgment, it proceeds to step SP43, while if it obtains a positive result, it sets "ON" for the path's maintenance attribute (stores "ON" in the "Maintenance Information" column 34F for the path in the integrated path management table 34) (SP42), and judges whether or not the same processing has been executed for all the paths registered in the integrated path management table 34 (SP43).

If the integrated path management manager 33 obtains a negative result, it returns to step SP40, and then repeats the same processing until it obtains a positive result at step SP43 (SP40 to SP43-SP40). The integrated path management manager 33 finally completes the same processing for all the paths registered in the integrated path management table 34, thereby obtaining a positive result at step SP43, and completes this maintenance mode setting processing.

Incidentally, when displaying the channel adapter list screen 60 (FIG. 12), the integrated path management manager 33 refers to the integrated path management table 34 to confirm the maintenance attribute for each of the paths going through the corresponding channel adapter 20.

When "ON" is set for the maintenance attribute for all the paths, the integrated path management manager 33 displays a character string, "Undergoing Maintenance," which indicates that the relevant channel adapter 20 is undergoing maintenance and serves as the maintenance information on the channel adapter 20, on the channel adapter list screen 60.

Meanwhile, when "ON" is set for the maintenance attribute for not all the paths, the integrated path management manager 33 displays a symbol "–," which indicates that the relevant channel adapter 20 is not undergoing maintenance and serves as the maintenance information for the channel adapter 20, on the channel adapter list screen 60.

Similarly, when displaying the host path list screen 80 (FIG. 18), the integrated path management manager 33 refers to the integrated path management table 34 to confirm the maintenance attribute for each of the paths connected to the corresponding operation host 2.

For the path with its maintenance attribute set to "ON" from among the paths, the integrated path management manager 33 then displays a character string, "Undergoing Maintenance" which indicates that the channel adapter 20, through which the relevant path goes, is undergoing maintenance and serves as the maintenance information for the path, on the host path list screen 80.

Meanwhile, for the path with its maintenance attribute set to "OFF" from among the paths, the integrated path management manager 33 displays the symbol "–," which indicates that the relevant channel adapter 20, through which the relevant path goes, is not undergoing maintenance and serves as the maintenance information for the path, on the host path list screen 80.

In this way, with the storage system 1, the maintenance mode setting is performed on the channel adapter list screen 60 for the channel adapter 20 to be replaced, and that the channel adapter 20 is undergoing maintenance is displayed on the channel adapter list screen 60 and the host path list screen 80.

(2-4) Undergoing-Maintenance Message Display Function

An undergoing-maintenance message display function provided in the management server 6 will be described next. The management server 6 is provided with the undergoing-maintenance message display function with which, even for the case where alert information on the occurrence of a failure in either path is sent from the operation host 2, when a maintenance mode has been set for the channel adapter 20 through which the path goes, an alert display screen 90 shown in FIG. 20 for displaying various warnings displays a message, like that shown in FIG. 21, to the effect that the corresponding channel adapter 20 is not available temporarily due to the maintenance (with reference to the row including the alert ID "0003" in FIG. 22, without displaying a message to the effect that the failure occurred in the path.

Specifically, with the storage system 1, the path management manager 14 in each operation host 2 always monitors the presence of failures for the paths connected to the operation host 2 concerned. When the path management manager 14 detects a failure occurrence in either path connected to the operation host 2, it sends alert information on: the ID for the message that corresponds to the failure content and data for the character string of the specific message, and the level of importance of the path failure; the host attribute, host bus adapter attribute, storage attribute, channel adapter attribute, and logical volume attribute for the path; and the path ID for the path to the management server 6.

In the management server 6, the storage device 32 (FIG. 1) stores the alert management table 91 shown in FIG. 22. The alert management table 91 is used by the integrated path management manager 33 (FIG. 1) in the management server 6 in order to control uniform management for the path failures in the storage system 1, and is composed of an "Alert ID" column 91A, a "Host" column 91B, a "Receipt Date" column 91C, a "Level of Importance" column 91D, a "Message ID" column 91E, a "Message" column 91F, a "VOL" column 91G, a "Subsystem" column 91H, a "CHA" column 91I, an "HBA" column 91J, and a "Bus ID" column 91K.

The "Alert ID" column 91A stores the ID given to alert information received, and the "Host" column 91B and the "Receipt Date" column 91C store the ID for the operation host 2 that has sent the alert information and the date the alert information was received, respectively. Also, the "Level of Importance" column 91D stores the level of importance for the path failure included in the alert information, and the "Message ID" column 91E and the "Message" column 91F store the message ID and the data for the specific message included in the alert information, respectively.

Also, the "VOL" column 91G, the "Subsystem" column 91H, the "CHA" column 91I, the "HBA" column 91J, and the "Bus ID" column 91K respectively store the logical volume attribute, storage attribute, channel adapter attribute, host bus adapter attribute, and path ID for the path, which serve as the information on the path with the occurrence of a failure.

When being given the alert information from the operation host 2, the management server 6 extracts necessary information on the host attribute, logical volume attribute, storage attribute, etc. from the alert information, and also registers the above information extracted from the alert information and other necessary information on the receipt date, etc in the alert registration table 91. At this point, the management server 6 refers to the integrated path management table 34 (FIG. 11). When the maintenance attribute for the path targeted for the alert information has been set to "ON," the management server 6 stores, in the corresponding "Message" column 91F in the alert management table 91, the data for, e.g., the message "The path for path ID "0001" is temporarily unavailable because CHA1 is undergoing maintenance" (hereinafter, referred to as "undergoing-maintenance message") instead of the message ID and the message data included in the alert information. The management server 6 also stores the message ID corresponding to the above message in the "Message ID" column 91E.

After that when being input with an order for the display of the alert display screen (FIGS. 20 and 21), the management server 6 reads the information stored in the "Host" column 91B, the "Receipt Date" column 91C, and the "Message" column 91F for each row of the alert management table 91, and displays the read information at the corresponding positions on the alert display screen 90. Accordingly, for the channel adapter 20 that has been preliminarily set in a maintenance mode, the undergoing-maintenance message is displayed on the alert display screen 90.

Figure 23:
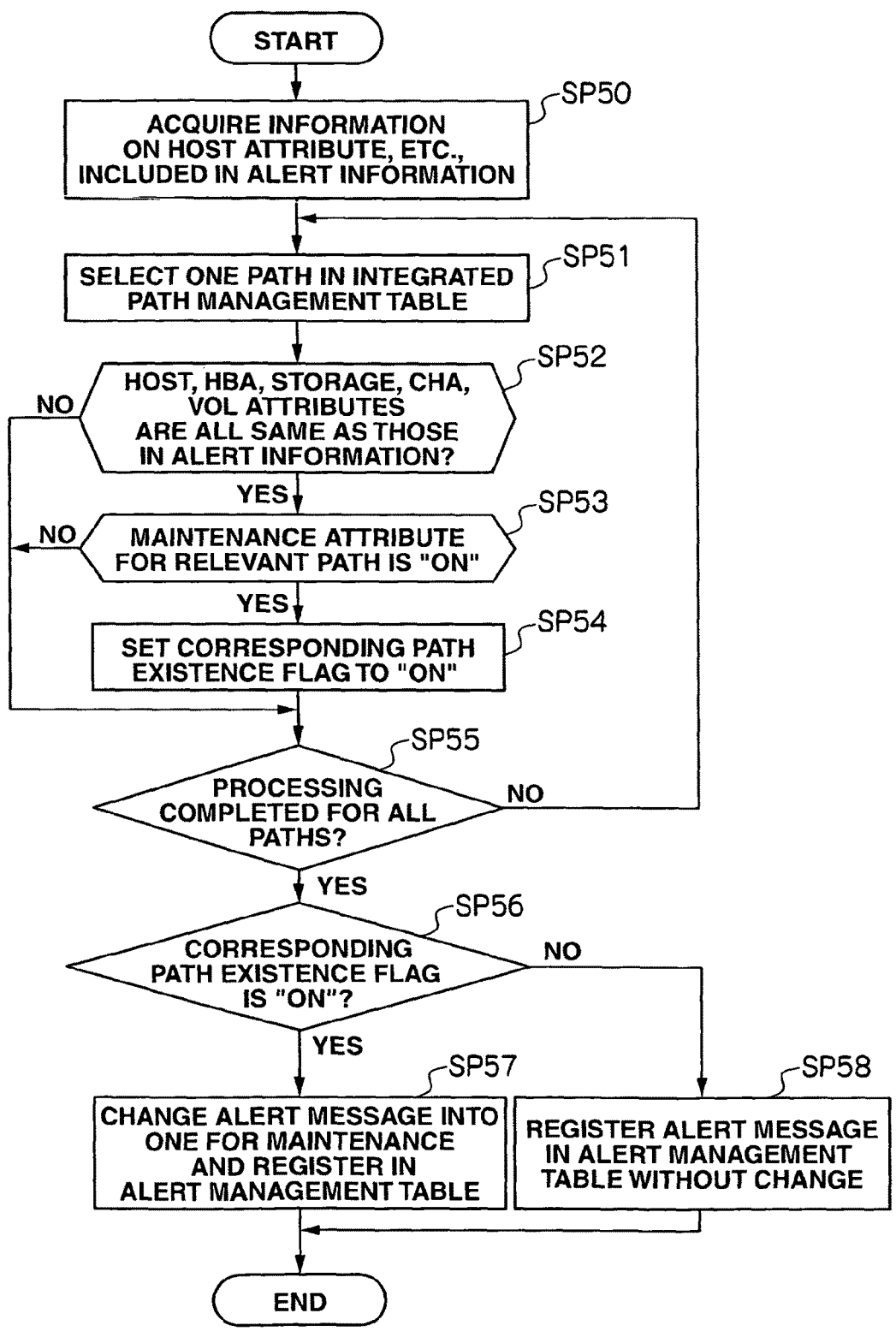
FIG. 23 is a flowchart showing the content of alert information registration processing executed by a processor in a management server.

In association with the display on the alert display screen 90, FIG. 23 shows the specific content of processing executed until the integrated path management manager 33 in the management server 6, which has received the alert information on the path failure from the operation host 2, completes registration of necessary information in the alert management table 91 based on the alert information.

More specifically, upon receiving the alert information from the operation host 2, the integrated path management manager 33 starts alert information registration processing shown in FIG. 23 and extracts the alert information to acquire the host attribute, host path adapter attribute, storage attribute, channel adapter attribute, and logical volume attribute (SP50).

The integrated path management manager 33 selects one of the paths registered in the integrated path management table 34 (SP51), and judges whether or not the host attribute, host path adapter attribute, storage attribute, channel adapter attribute, and logical volume attribute for the selected path are all identical to those acquired at step SP50 (SP52).

If the integrated path management manager 33 obtains a negative result for this judgment, it proceeds to step SP55; meanwhile, if it obtains a positive result, it judges whether or not the maintenance attribute for the path has been set to "ON" (SP53). When the integrated path management manager 33 obtains a negative result for this judgment, it proceeds to step SP55; meanwhile, if it obtains a positive result, it sets a corresponding path presence flag prepared in the memory 31 to ON (SP54).

After that, the integrated path management manager 33 judges whether or not the same processing has been executed for all the paths registered in the integrated path management table 34 (SP55). If the integrated path management manager 33 obtains a negative result for this judgment, it returns to step SP51, and then repeats the same processing until it obtains a positive result at step SP55 (SP51 to SP55-SP51).

After executing the same processing for all the paths registered in the integrated path management table 34, thereby obtaining a positive result at step SP55, the integrated path management manager 33 judges whether or not the corresponding path existence flag has been set to ON (SP56).

If the integrated path management manager 33 obtains a positive result for this judgment, it converts the data of the message, which is to be stored in the "Message" column 91F in the alert management table 91, into the data for the above-described undergoing-maintenance message, and then registers necessary information in the alert management table 91 (SP57). The integrated path management manager 33 then terminates the alert information registration processing.

Meanwhile, if the integrated path management manager 33 obtains a negative result for the judgment at step SP56, it registers the data of the message corresponding to the message ID extracted from the alert information as necessary information, the data being for the message to be stored in the "Message" column 91F, in the alert management table 91 (SP58). The integrated path management manager 33 then terminates the alert information registration processing.

(3) Advantageous Effects of this Embodiment

As described above, with the storage system 1 according to this embodiment of the present invention, the management server 6 controls uniform management for the path information on the paths in the storage system 1, and for the paths going through the channel adapter 20 selected on the channel adapter list screen 60, the alternate path going through the channel adapter 20 other than the selected channel adapter 20 can be retrieved and displayed based on the information on the paths. Accordingly, the facilitation of the replacement of the channel adapter 20 can be made easier dramatically.

Also, with this storage system 1, the "Refresh Hosts" button 62 is clicked after the selection of the channel adapter 20 on the channel adapter list screen 60, executing the host refresh that targets the operation hosts 2 connected to the paths going through the channel adapter 20. Then, the "Show Paths" button 61 on the channel adapter list screen 60 is clicked, displaying the post-host refresh state of the path. As a result, it can be confirmed easily whether or not a path influenced by replacement of the channel adapter 20 has returned to normal after that replacement.

Also, with the storage system 1, when the channel adapter 20 selected on the channel adapter list screen 60 is stopped the channel adapters 20 able to be stopped simultaneously with the above channel adapter 20 can also be retrieved. Therefore, replacing plural channel adapters 20 can be performed simply. Accordingly, the facilitation of the replacement of the channel adapter 20 can be made easier markedly.

Moreover, with the storage system 1 in this embodiment, the maintenance mode has been set for the replacement-target channel adapter 20. This enables, with respect to the channel adapter 20 or the paths going through the channel adapter 20, it to be displayed on the channel adapter list screen 60 or the host path list screen 80 that the channel adapter 20 or the channel adapter 20 through which the paths go is undergoing maintenance. Accordingly, which path is undergoing maintenance can be confirmed easily.

Furthermore, with the storage system 1 in this embodiment, the maintenance mode has been set for the replacement-target channel adapter 20. This enables a message to the effect that the relevant path is temporarily unavailable due to the maintenance to be displayed even when the alert information on the path going through the channel adapter 20 is sent from the corresponding operation host 2 to the management server 6 during the replacement of the channel adapter 20. Accordingly, an administrator of the storage system 1 can easily judge whether the path is intentionally and temporarily in an error state due to the replacement of the channel adapter 20 or the path failure has occurred during business operation.

(4) Other Embodiments

The above embodiment has been described for the case where this invention is utilized in the storage system 1 configured as in FIG. 1. However, the invention is not limited to this case, and other storage systems with a wide variety of configurations can be utilized in the invention.

The above embodiment has been described for the case where the channel adapter list screen 60 and the host path list screen 80 have the configurations shown in FIGS. 12 and 18, respectively. However, the invention is not limited to this case, and a wide variety of other screen configurations can be utilized in the invention.

The above embodiment has been described for the case where the integrated path management unit that collects the path information on each of the paths, which are defined between the hosts and the volumes from the hosts to manage all the collected information in the integrated path management table 34; retrieves the alternate path that goes through the channel adapter 20 other than the specified channel adapter 20, for the paths going through the specified channel adapter 20 based on the integrated path management table; and displays the retrieval results on the display 36, is composed of the processor 30 for controlling the operation of the entire management server 6 and the integrated path management manager 33. However, the invention is not limited to this case, and for example, a configuration may be adopted where: a separate processor other than the processor 30 is provided; and the processor and the integrated path management manager 33 constitute an integrated path management unit.

The above embodiment has been described for the case where the integrated path management table 34 composed of the integrated path information including the path information on the paths defined between the operation hosts 2 and the logical volumes VOL is configured as shown in FIG. 11. However, the invention is not limited to this case, and a wide variety of other configurations for the integrated path management table 34 can be utilized in the invention.

Also, the above embodiment has been described for the case where, when the alert information on the path going through the channel adapter 20 for which the maintenance mode has been set is given from the corresponding operation host 2, the message to the effect that the path is unavailable temporarily due to the maintenance is displayed. However, the invention is not limited to this case. The point is that various methods of displaying a warning concerning a path failure in the path going through the undergoing-maintenance channel adapter 20 can be utilized in the invention as long as, regarding the path going through the undergoing-maintenance channel adapter 20, different warnings are displayed on the display 36 for the case where the alert information on the path going through the channel adapter 20 for which the maintenance mode has not been set is received and the case where the alert information on the path going through the channel adapter 20 for which the maintenance mode has been set is received, so as to indicate that the path failure is temporary due to the maintenance.

Also, the above embodiment has been described for the case where the maintenance-target is the channel adapter 20. However, the invention is not limited to this. The case where the node, other than the channel adapter 20 and through which the paths set between the operation hosts and the logical volumes VOL go (e.g., the host bus adapter 12 or the FC switch constituting the first network 3), is employed as a maintenance-target is also utilized in the invention. In this case, it may suffice that when retrieving the alternate path for the path going through the maintenance-target node, the integrated path management manager 33 in the management server 6 retrieves an alternate path going through the node other than the specified path and that has the same function as the specified node.

Moreover, the above embodiment has been described for the case where, with the simultaneously stoppable channel adapter retrieval and display function, the sets of channel adapters 20 able to be stopped simultaneously with the channel adapter 20 selected on the channel adapter list screen 60 are retrieved to be displayed. However, the invention is not limited to this. The channel adapters 20 do not need to be displayed in a set. A configuration may be adopted where the integrated path management manager 33 selects either channel adapter 20 in the set, and only the channel adapter 20 is displayed.

Furthermore, the above embodiment has been described for the case where various screens such as the channel adapter list screen 60 described with reference to FIG. 12, the alternate path confirmation screen 66 described with reference to FIG. 14, the simultaneously stoppable CHA confirmation screen 70 described with reference to FIG. 16, the host path list screen 80 described with reference to FIG. 18, and the alert display screen 90 described with reference to FIGS. 20 and 21 are displayed only on the display 36 in the management server 6. However, the invention is not limited to this. A configuration may be adopted where: the integrated path management manager 33 in the management server 6 provides an apparatus other than the management sever 6 with necessary information; and the screens are displayed on a display on the apparatus.

What is claimed is:

1. A storage system comprising:
a host that is a host system;
a storage apparatus that provides a volume that is a storage area for input/output with the host; and
a management apparatus that manages a logical path for data input/output, the logical path being set between the host and the volume, wherein:
the host sets plural logical paths between the host and the volume and holds path information composed of management information on each of the logical paths; and
the management apparatus includes an integrated path management unit configured to:
collect the path information on each of the logical paths between the host and the volume, to manage all the collected information as integrated path information; retrieve an alternate logical path through a node other than a specified node but that has the same function as the specified node based on the integrated path information; determine whether the alternate logical path is in an online state; and display results of the retrieval;
display path information for each logical path going through the specified node;
execute a host refresh procedure, wherein the path information on each logical path to each host going through the specified node is updated;
display one or more sets of nodes that are able to be stopped together with the specified node; and
place the specified node into a maintenance mode.

2. The storage system according to claim 1, wherein the host refresh procedure includes the integrated path management unit further configured to:
collect the latest path information on the logical path through the specified node from the host, and
display the latest state for the logical path based on the collected path information.

3. The storage system according to claim 1, wherein the integrated path management unit retrieves a node, which has the same function as the specified node and is replaceable together with the specified node, based on the integrated path information, and displays results of the retrieval.

4. The storage system according to claim 3, wherein the integrated path management unit retrieves a set of nodes, each node having the same function as the specified node and at least one of the set of nodes is replaceable together with the specified node, based on the integrated path information, and displays results of the retrieval.

5. The storage system according to claim 4, wherein the integrated path management unit stores the node set in a maintenance mode, and displays, for the node set in the maintenance mode or the logical path through the node, that the node or the path through the node is undergoing maintenance.

6. The storage system according to claim 5, wherein:
the host monitors the logical path connected to the host, and when a failure occurs, the host sends alert information in accordance with the failure to the management apparatus; and
the integrated path management unit displays different warnings for the case where it has received the alert information on a logical path through a node for which the maintenance mode has not been set and the case where it has received the alert information on a logical path through a node for which the maintenance mode has been set.

7. A path management method for a storage system including: a host that is a host system; a storage apparatus that provides a volume that is a storage area for input/output with the host; and a management apparatus that manages a logical path for data input/output, the logical path being set between the host and the volume, the method comprising:
the host setting plural logical paths between the host and the volume and holding path information composed of management information on each of the logical paths;
the management apparatus collecting the path information on each of the logical paths between the host and the volume, to manage all the collected information as integrated path information; retrieving an alternate logical path through a node other than a specified node but that has the same function as the specified node based on the integrated path information; determining whether the alternate logical path is in an online state; and displaying results of the retrieval;
the management apparatus displaying information for each logical path going through the specified node;
the management apparatus executing a host refresh procedure, wherein the path information on each logical path through the specified node is updated;
the management apparatus displaying one or more sets of nodes that are able to be stopped together with the specified node; and
the management a apparatus placing the specified node into a maintenance mode.

8. The path management method according to claim 7, wherein in the host refresh procedure, the management apparatus collecting the latest path information on the logical path through the specified node from the host, and displaying the latest state for the logical path based on the collected path information in response to an external operation.

9. The path management method according to claim 7, further comprising: the management apparatus retrieving a node, which has the same function as the specified node and is replaceable together with the specified node, based on the integrated path information, and displaying results of the retrieval.

10. The path management method according to claim 9, further comprising: the management apparatus retrieving a set of nodes, each node having the same function as the specified node and at least one of the set of nodes is replaceable together with the specified node, based on the integrated path information, and displaying results of the retrieval.

11. The path management method according to claim 10, further comprising: the management apparatus storing the node set in a maintenance mode, and displaying, for the node set in the maintenance mode or the logical path through the node, that the node or the path through the node is undergoing maintenance.

12. The path management method according to claim 11, further comprising:
- the host monitoring the logical path connected to the host, and when a failure occurs, the host sending alert information in accordance with the failure to the management apparatus; and
- the management apparatus displaying different warnings for the case where it has received the alert information on a logical path through a node for which the maintenance mode has not been set and the case where it has received the alert information on a logical path through a node for which the maintenance mode has been set.

\* \* \* \* \*